(12) United States Patent
Ho

(10) Patent No.: US 10,051,342 B1
(45) Date of Patent: Aug. 14, 2018

(54) DYNAMIC GENERATION OF ON-DEMAND VIDEO

(71) Applicant: TP Lab, Inc., Palo Alto, CA (US)

(72) Inventor: Chi Fai Ho, Palo Alto, CA (US)

(73) Assignee: TP Lab, Inc., Palo Alto, CA (US)

( * ) Notice: Subject to any disclaimer, the term of this patent is extended or adjusted under 35 U.S.C. 154(b) by 11 days.

(21) Appl. No.: 14/660,947

(22) Filed: Mar. 18, 2015

(51) Int. Cl.
| | |
|---|---|
| H04N 7/173 | (2011.01) |
| H04N 21/8352 | (2011.01) |
| H04N 21/44 | (2011.01) |
| H04N 21/472 | (2011.01) |
| H04N 21/61 | (2011.01) |
| H04N 21/431 | (2011.01) |
| H04N 21/2343 | (2011.01) |
| H04N 21/235 | (2011.01) |
| H04N 21/435 | (2011.01) |
| H04N 21/81 | (2011.01) |

(52) U.S. Cl.
CPC ..... H04N 21/8352 (2013.01); H04N 7/17336 (2013.01); H04N 21/2358 (2013.01); H04N 21/23439 (2013.01); H04N 21/435 (2013.01); H04N 21/4312 (2013.01); H04N 21/44016 (2013.01); H04N 21/47202 (2013.01); H04N 21/6125 (2013.01); H04N 21/8133 (2013.01)

(58) Field of Classification Search
CPC ......... H04N 21/8352; H04N 21/44016; H04N 21/47202; H04N 21/6125; H04N 21/4312; H04N 21/23439; H04N 21/2358; H04N 21/435; H04N 21/8133
See application file for complete search history.

(56) References Cited

U.S. PATENT DOCUMENTS

| | | | | |
|---|---|---|---|---|
| 2007/0294622 | A1* | 12/2007 | Sterner | G06Q 30/00 715/716 |
| 2012/0262484 | A1* | 10/2012 | Gottfeld | G09B 5/065 345/632 |
| 2016/0066025 | A1* | 3/2016 | Wang | H04N 21/4331 725/14 |
| 2016/0134673 | A1* | 5/2016 | MacInnis | H04L 65/60 709/231 |

OTHER PUBLICATIONS

U.S. Appl. No. 62/077,553, spec. filed on Nov. 10, 2014.*
U.S. Appl. No. 62/077,553, drawings filed on Nov. 10, 2014.*

\* cited by examiner

*Primary Examiner* — Yassin Alata
(74) *Attorney, Agent, or Firm* — North Shore Patents, P.C.; Michele Liu Baillie

(57) ABSTRACT

In a method for playing a video generated on-demand, a video player sends a video request to a video service provider over a data network. The video player receives a video media file from the video service provider. The video media file includes a plurality of cue slots including a plurality of video clip files. The video player obtains the plurality of video clip files from the plurality of cue slots and plays the plurality of video clip files. Each video clip file may include video data and a description, and the description may include location information and/or licensing information. A given video clip file(s) may include instructions for an animation and/or instructions for displaying video clip file(s) in an overlaid manner. Each of the cue slots may include comprises a start time, where the video clip files are played according to the start times.

29 Claims, 4 Drawing Sheets

DYNAMIC GENERATION OF ON-DEMAND VIDEO

BACKGROUND OF THE INVENTION

Field

This invention relates generally to media, and more specifically, to a method to generate a video dynamically for a viewer.

Related Art

Watching video over the Internet is becoming a major trend. Internet video portals such as Netflix™, Hulu™, Amazon Instant Video™, YouTube™ and many others allow a viewer to select and watch a video. A viewer specifies keywords. Some portals ask for approximate time duration and a submission time of the video. The portals match the criteria to their video libraries and select matching videos. When two viewers watch the same video selected by a portal, they will see the same video signals and data, despite one viewer having a different preference than another viewer. For example, two viewers watch the movie "Avengers", where super-heroes battle against super-villains. One viewer is from Asia and would enjoy the movie more if the battle scenes show her favorite buildings and cities being destroyed by the villains or saved by the heroes. The other viewer is in his 50's and would enjoy the movie better if some of the scenes related to the 1970's, for example, by playing background music by the Bee Gees when the super-heroes meet to discuss a plan to fight the villains.

Studios and producers often are aware of the targeted audience. The scenes and acts are carefully scripted for different audiences, viewer demographics, countries, and cultures, among other considerations. Many acts and scenes are filmed and edited into multiple video clip editions according to the viewer-targeted scripts. The video clips are then combined into different releases targeted for different markets. Each release is a complete edition and is considered a video. In the above example, the producer may release an Asian-targeted edition of "Avengers" and a 1970-targeted edition of "Avengers". When a viewer is a 50-something Asian, the viewer cannot watch a hybrid edition between the Asian edition and the 1970-edition, despite the studio having the necessary video clips to produce the desired hybrid edition for the 50-something Asian patron.

In another scenario, a sports video crew is televising a live World Cup soccer match. Many cameras are set up to capture the match in many angles. In the production studio, a director watches multiple screens and decides when and which camera's output is to be televised. The decision is often based on her knowledge about the targeted audience in a market. When the match is televised to multiple markets and countries, many directors are involved to decide when and which camera's output is used for which market. For example, the match is between Germany and Brazil. The Brazilian version shows many angles of the Brazilian team, and the Germany version shows more of the German players. If a German visits Rio and watches the game, he would see the Brazilian version and not the German version. It would be a good experience if the visiting German can see a bit more of the German players and at the same time can share the Brazilian plays with his Brazilian friends. The German viewer would have liked to see a hybrid version of the televised event. Again, despite the crew having set up the cameras to capture all the video signals, the German viewer is not satisfied.

In another scenario, a video portal inserts advertisements to a television show video. The television show was released a day earlier on a broadcast channel and is 23 minutes in length. The video portal decides on a schedule of showing the video with advertisements in a 30-minute schedule. When the video is shown during evening prime time, the video portal is able to attract more advertisers and would like to have a total of 10 minutes of advertisement. When the video is shown during late night hours, the video portal is not able to attract premium advertisers and would like to set it to 5 minutes of advertisement. In order to do so, the video portal needs a 20-minute long version of the video for the prime time evening, and a 25-minute long version of the video for midnight hours. In this scenario, the video portal is not able to provide the flexibility for advertisement due to the constraints of the television show video length.

The above scenarios illustrate the need to generate a video on demand using a plurality of video clips.

BRIEF SUMMARY OF THE INVENTION

According to one embodiment of the present invention, in a method for playing a video generated on-demand, a video player sends a video request to a video service provider over a data network. The video player receives a video media file from the video service provider. The video media file comprises a plurality of cue slots comprising a plurality of video clip files. The video player obtains the plurality of video clip files from the plurality of cue slots and plays the plurality of video clip files.

In one aspect of the present invention, each of the plurality of video clip files comprises video data and a description.

In one aspect of the present invention, in playing the plurality of video clip files, the video player displays the video data and the description.

In one aspect of the present invention, the description of a given video clip file comprises at least one of the following: location information and licensing information.

In one aspect of the present invention, one or more given video clip files of the plurality of video clip files comprise instructions for an animation. In playing the plurality of video clip files, the video player executes the instructions to display the animation.

In one aspect of the present invention, two or more given video clip files of the plurality of video clip files comprise instructions for displaying the two or more given video clip files in an overlaid manner. In player the plurality of video clip files, the video player executes the instructions to display the two or more given video clip files in the overlaid manner.

In one aspect of the present invention, each of the plurality of cue slots comprises a start time. The video player plays the plurality of video clip files according to the start times in the plurality of cue slots.

In one aspect of the present invention, the video player determines that a given cue slot of the plurality of cue slots does not contain a given video clip file, sends a request to the video service provider for the given video clip file, and receives the given video clip file from the video service provider.

System and computer program products corresponding to the above-summarized methods are also described and claimed herein.

DETAILED DESCRIPTION OF THE INVENTION

Figure 1:
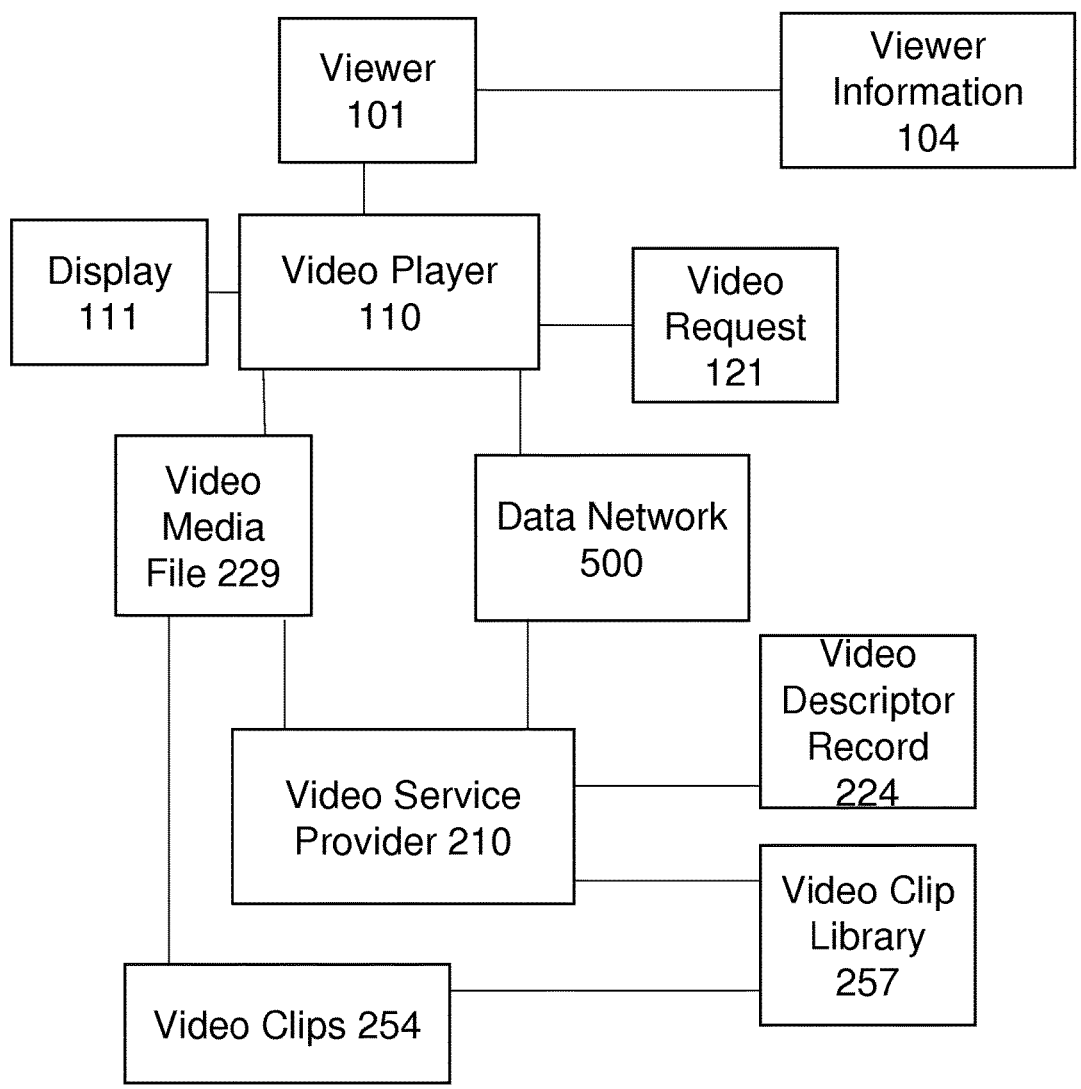
FIG. 1 illustrates an embodiment of providing a video service to a viewer.

FIG. 1 illustrates an embodiment of a viewer requesting and viewing a video. In one embodiment, viewer 101 uses a video player 110 to send a video request 121 for a video. Video request 121 is sent via a data network 500 to video service provider 210. Upon receiving video request 121, video service provider 210 selects a video descriptor record 224 matching video request 121. According to the information enclosed in video descriptor record 224, video service provider 210 generates a video media file 229 which includes a plurality of video clips 254 selected from video clip library 257. In one embodiment, viewer 101 provides viewer information 104 to assist video service provider 210 to select video descriptor record 224 and to select video clips 254 from video clip library 257. In one embodiment, video service provider 210 sends generated video media file 229 to video player 110 as a response to video request 121. Video player 110 receives video media file 229 and obtains the plurality of video clips 254. Video player 110 plays the plurality of video clips 254 on a display 111 coupled to the video player 110 for viewer 101 to watch.

In one embodiment, viewer 101 is a user watching the display 111 coupled to video player 110. In one embodiment, viewer 101 may include a group of viewers or a family watching a movie or a television show. Viewer 101 may include a number of patrons in a restaurant or a sports bar watching a televised sport event, a music video, a concert, a drama performance, a movie, a television show or a cartoon animation. Viewer 101 may include one or more corporate viewers watching a private video, a number of patrons of a library or cinema watching a public video. In one embodiment, video request 121 is a request for a televised event, a news cast, an artistic performance, a music video, a presentation, an on-line course, a television show, a movie, an infomercial, a promotion video, an advertisement, an animation, a documentary, a live event, a live surveillance camera, or any video that can be composed using a plurality of video clips.

Figure 2:
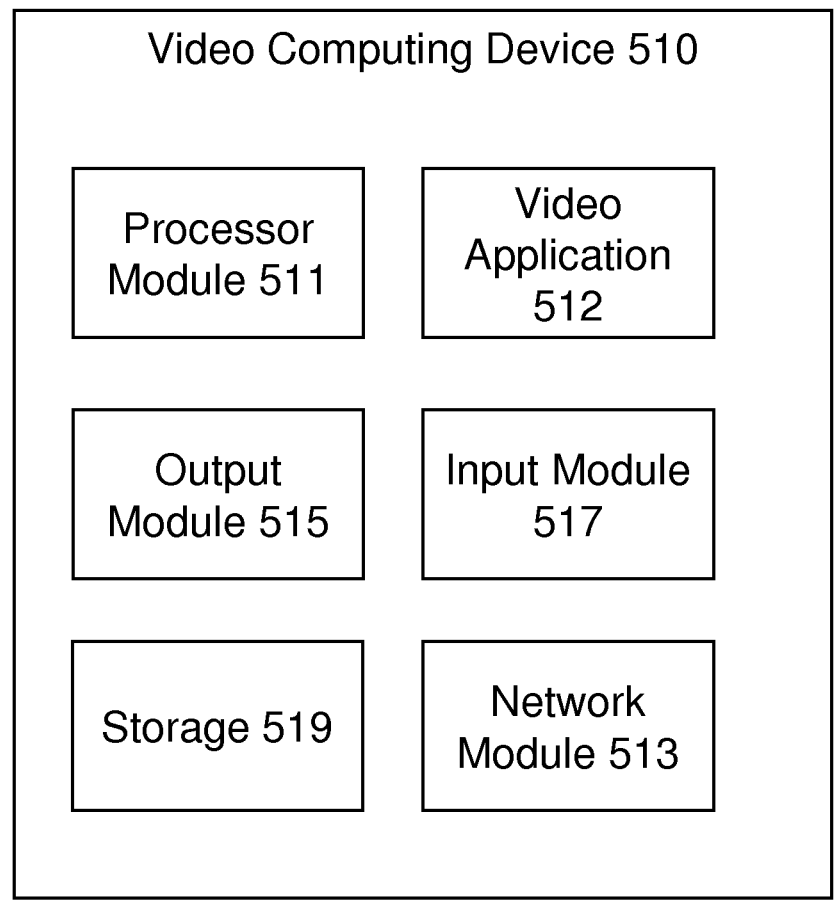
FIG. 2 illustrates an embodiment of a network video computing device.

FIG. 2 illustrates a network video computing device which can be video player 110 or video service provider 210. In one embodiment, video computing device 510 includes a processor module 511, an output module 515, an input module 517, storage 519 and a network module 513. In one embodiment, processor module 511 includes one or more general processors, a multi-core processor, an application specific integrated circuit based processor, a system on a chip (SOC) processor or an embedded processor. In one embodiment, output module 515 includes a display for displaying images and text, an audio speaker, an image projector, or other forms of computer output. In one embodiment, input module 517 includes a physical or logical keyboard, buttons, keys, microphones, sensors such as optical sensor, infrared (IR) sensor, camera sensor, motion sensor, direction sensor, location sensor, or any sensor that is usable for a user to provide input to video computing device 510. In one embodiment, storage 519 includes a main memory, a hard disk drive (HDD), a solid state drive (SSD), a memory card, a ROM module, a RAM module, a USB disk or other storage component, or other computer readable media not including signals per se. In one embodiment, network module 513 includes hardware and software to connect to a data network such as Ethernet, a wired network, a wireless network, a cellular network, a mobile network, a Bluetooth network, a NFC network, a personal area network (PAN) or a WiFi network. Storage 519 includes executable programming instructions, which when executed by the processor module 511 of video computing device 510, implement one or more functionalities of the invention. In one embodiment, video computing device 510 includes a video application 512 which includes one or more computer programming instructions to perform video processing. In one embodiment, video application 512 is stored in storage 519.

Video computing device 510 need not have all of the modules illustrated in FIG. 2. In one embodiment, video computing device 510 does not have input module 517 or output module 515. In one embodiment, video computing device 510 connects to an output module 515 or an input module 517 that is external to the video computing device 510.

In one embodiment, video player 110 of FIG. 1 is a video computing device 510 in which video application 512 sends video request 121, receives video media file 229 and plays video media file 229. In one embodiment, video service provider 210 is a video computing device 510 in which video application 512 processes video request 121, generates video media file 229 and sends video media file 229 to video player 110. In one embodiment, video service provider 210 includes a plurality of video computing devices. In one embodiment, video player 110 includes two or more video computing devices in order to process video request 121 and video media file 229.

Returning to FIG. 1, data network 500, in one embodiment, includes the Internet, a consumer home network, an enterprise network, a local area network, a hotspot, a data network in a store, a wireless network, a mobile broadband network, a cellular data network, a private network, a corporate network, or a network in a data center. In one embodiment, video player 110 includes a television set, a set top box, a video streaming player, a personal computer connecting to display, a game console, a dongle-size media player, a tablet, a smartphone, a smart helmet, a smart glassware, or a computing device in a vehicle. In one embodiment, video player 110 includes a piece of software for processing the sending of video request 121, receiving video media file 229 and playing video clips 254. In one embodiment, video player 110 displays video clips 254 over an externally coupled display or on a display included in video player 110.

In one embodiment, video descriptor record 224 contains a description of a movie. The plurality of video clips 254 comprises the video signals or the video data of the movie. In one embodiment, each video clip includes video data of a section of the movie, a time duration of the movie, a scene, a part of a scene, an act, an animation as part of the movie, an animated video embedded in the movie, or a plurality of executable programming instructions to generate an animation of the movie. In one embodiment, several video clips or a group of video clips of the plurality of video clips 254 may show the same scene, or the same portion of the movie with slight differences between the several video clips. In one embodiment, one of the several video clips may show an actor using an Apple iPhone™ while another video clip shows the same actor using a Samsung Galaxy smartphone or a Xiaomi phone. In one embodiment, the several video clips may show similar video but with different backgrounds such as background of a European scene, an animated scene, an Asian scene, or a Latin American scene. In one embodiment, the several video clips may show an actress speaking English with a British accent, an Australian accent, a Texan accent, or a Filipino accent. In one embodiment, the several video clips display a banner in simplified Chinese characters, traditional Chinese characters, or Kanji characters. In one embodiment, the several video clips are filmed to address different markets, different targeted audiences, different languages, or different video distribution merchants.

In one embodiment, the several video clips show a televised event using different angles, different cameras, or focusing on different players or people. In one embodiment, video descriptor record 224 contains a description of a televised sport event. The several video clips may show a touchdown using a sky-cam camera, a camera attached to the goal pole, a body camera attached to the helmet of the player running for the touchdown, a helmet camera of the quarter throwing for the touchdown, or a helmet camera of the running back diving into the end-zone. The several video clips may show a slam-dunk from a camera attached to the basket, a camera attached to the goggle of the player making the slam-dunk, a camera showing the defensive player in awe when the slam-dunk is made, or an optical sensor attached to the basketball when the ball leaves the player's hand until the ball drops to the floor.

In one embodiment, video descriptor record 224 contains a description of a news video. The several video clips may show a sunny day city background when the video descriptor record 224 is requested during day time hours, a peaceful night time country side background when the video file is requested during evening hours, a pair of news anchorman speaking with a Southern accent when the video file is requested when a location of video player 110 indicates video player 110 is located in a Southern state, an anchorwoman speaking with a New York city accent, background music popular in the San Francisco Bay Area, or a clock showing Paris time.

In one embodiment, video descriptor record 224 contains a description of a television show or a movie. The several video clips may show a similar scene with different durations, one video clip of the scene that is 10 seconds shorter than another video clip of the same scene, one video clip with an actress speaking one more sentence than in another video clip, one video clip with an actor performing extra kung-fu moves than in another video clip, a PG-13 approved rating video clip that is shorter than a R-rated video clip with additional violent acts. The several video clips may include one PG-13 rated video clip while another is R-rated, or one video clip featuring one actress while another video clip featuring a different actress. The several video clips may have different durations targeted for different time schedules, different market segments, different countries, different cities, or different current events when video descriptor record 224 is requested.

In one embodiment, video descriptor record 224 contains a description of a graphical animation. The several video clips may show an animation using different sets of executable programming instructions, one set showing an animation with a poodle when executed, and one set showing an animation of a cat when executed. The several video clips may show a similar animation in different details, resolutions, a spaceship venturing through different galaxies, different planets, or different external spaceship structures, based on targeted audiences or markets. The several video slips may show animated characters fighting using Chinese martial arts, Japanese judo, boxing, or other fighting forms based on viewer information 104 and/or other information.

In one embodiment, the several video clips are to be displayed simultaneously in different regions of the display or in an overlaid manner on the display in order to achieve the desired visual effect. In this embodiment, the several video clips include executable programming instructions, which when executed, causes the video player 110 to display the several video clips for the desired visual effect.

In one embodiment, video service provider 210 includes a network video computing device illustrated in FIG. 2. In one embodiment, video service provider 210 includes a piece of video server software for processing the video request 121. In one embodiment, video service provider 210 includes a server computer. In one embodiment, video service provider 210 resides in a content delivery network delivering a requested video according to video request 121. In one embodiment, video service provider 210 includes a home broadband media gateway, connecting to video player 110 over a home or consumer network. In one embodiment, video service provider 210 includes a media server residing in a private network in a public place such as a restaurant, a cinema, a library, a retail store, a stadium or a coffee shop. In one embodiment, video service provider 210 connects to video player 110 over a local area network. In one embodiment, video service provider 210 includes a network appliance for video delivery.

In one embodiment, video request 121 includes one or more of a title of a video, a part of a title of a video, name of an actor, an actress, a director, a producer, a cast member, a screen writer, a composer, a critic or an author, a genre, and one or more words relating to a story of a video. In one embodiment, video request 121 includes location information related to video player 121 such as a geographic location, a street address, a geophysical location, a location within a building structure, a location inside a house, a location within a vehicle such as a ship, a train, or a bus. In one embodiment, video request 121 includes location information of viewer 101. In one embodiment, location of viewer 101 is different from location of video player 110.

For example, in one embodiment, the video player 110 includes a set top box, which receives instructions from the viewer 101 via a viewer device (not shown), different from the video player 110, over the data network 500. The video player 110 receives the video media file 229 and relays the video media file 229 to the viewer device for display.

For another example, in one embodiment, the video player 110 is a home video hub at a location, such as a street address. The video player 110 receives the video media file 229 and plays the video on a display (not shown), different from the display 111, at a different place in the home from the video player 110, e.g., in a different room from the video player 110.

For another example, in one embodiment, the video player 110 is a video server (not shown) at a store, e.g. a sports bar, a mini-cinema, a library, or a train station. The video player 110 has a location, such as an address, and a building location when there are multiple video players at different locations throughout the store. The video player 110 may play different versions of the video on displays in different locations in the store. In this embodiment, different video media files may be displayed for different viewer locations given the same video player location, as well as different versions of the video media file for the same viewer location given different video player locations. As an illustration, when the viewer 101 sits on a couch in an airport terminal, the viewer 101 may watch different versions of the same video served by Starbucks™ and United Airlines Red Carpet Club™ which are located at two different locations in the airport but both within viewing distance from the couch.

For another example, in one embodiment, the video player 110 is in an airplane at a current location, such as a country or a geo-location. The viewer 101 is seated in a section of the airplane, where the viewer's location may be in the first class, coach, or business class section. Different versions of the video may be displayed for viewers in the different sections of the airplane. As an illustration, a viewer seated in the first class section may see a version without an advertisement video clip, while a viewer seated in the business class section may see a version with the advertisement video clip, and while a viewer seated in the coach section may see a general version of the video.

In one embodiment, video request 121 includes location information of video player 110 and location information of viewer 101. In one embodiment, video request 121 includes capability information of video player 110 such as resolution of a display, physical dimension, 3D capabilities, audio or video decoding capabilities, software version, or any computing capability information that helps video service provider 210 to determine and generate video media file 229.

In one embodiment, video request 121 includes business information related to video player 110. Business information of video player 110 may include distribution rights information, access rights information, licensing information, promotion information, payment information such as requesting a free video, an advertisement-sponsored video, charging account information, or subscription information.

In one embodiment, video request 121 includes one or more preferences pre-stored in video player 110. In one embodiment, video request 121 is for a sports event, and a preference includes home team, visiting team, half time show, or no half time show. In one embodiment, preferences include a language preference, a nation preference, a cast preference, a camera angle preference, a duration preference, a rating preference, or any preference helping to determine and generate video media file 229.

In one embodiment, video request 121 includes a piece of time information such as a time of day, a date, a schedule or a special event such as a holiday, a celebration, or a company occasion.

In one embodiment, viewer 101 is associated with viewer information 104. Viewer information 104 may include one or more information of: viewer demographic information which include location information, viewer gender, age group, income; viewer personal information such as a name, an avatar identity, an email address, a social media identity, birthday, age, credit card information, buying or commercial transaction history, video watching history; viewer interests such as actors, actresses, casts, directors, producers; viewer preferences such as language, genre, release dates, rating, duration; viewer location information such as current location, geo-physical location, city location, country location, street address, region, district, area, building information, landmarks, retail shops, past locations; view social network information such as viewer identity, friends, friends' information, friends' recommendation or preferences; viewer payment information such as subscription information, payment history; or viewer organization information such as organization identity, business location.

In one embodiment, viewer 101 provides video player 120 viewer information 104. In one embodiment, video player 120 includes part or all viewer information 104 in video request 121. In one embodiment, video player 120 obtains viewer information 104 such as current location, subscription information, social network identity, transaction or viewing history, or other viewer information, prior to sending viewer information 104. In one embodiment, video player 120 sends viewer information 104 to video service provider 210 in a separate communication session other than video request 121. In one embodiment, viewer information 104 is sent to a network computing device in data network 500, and video service provider 210 obtains viewer information 104 from the network computing device. In one embodiment, video service provider 210 obtains viewer information 104 from viewer 101.

Figure 3A:
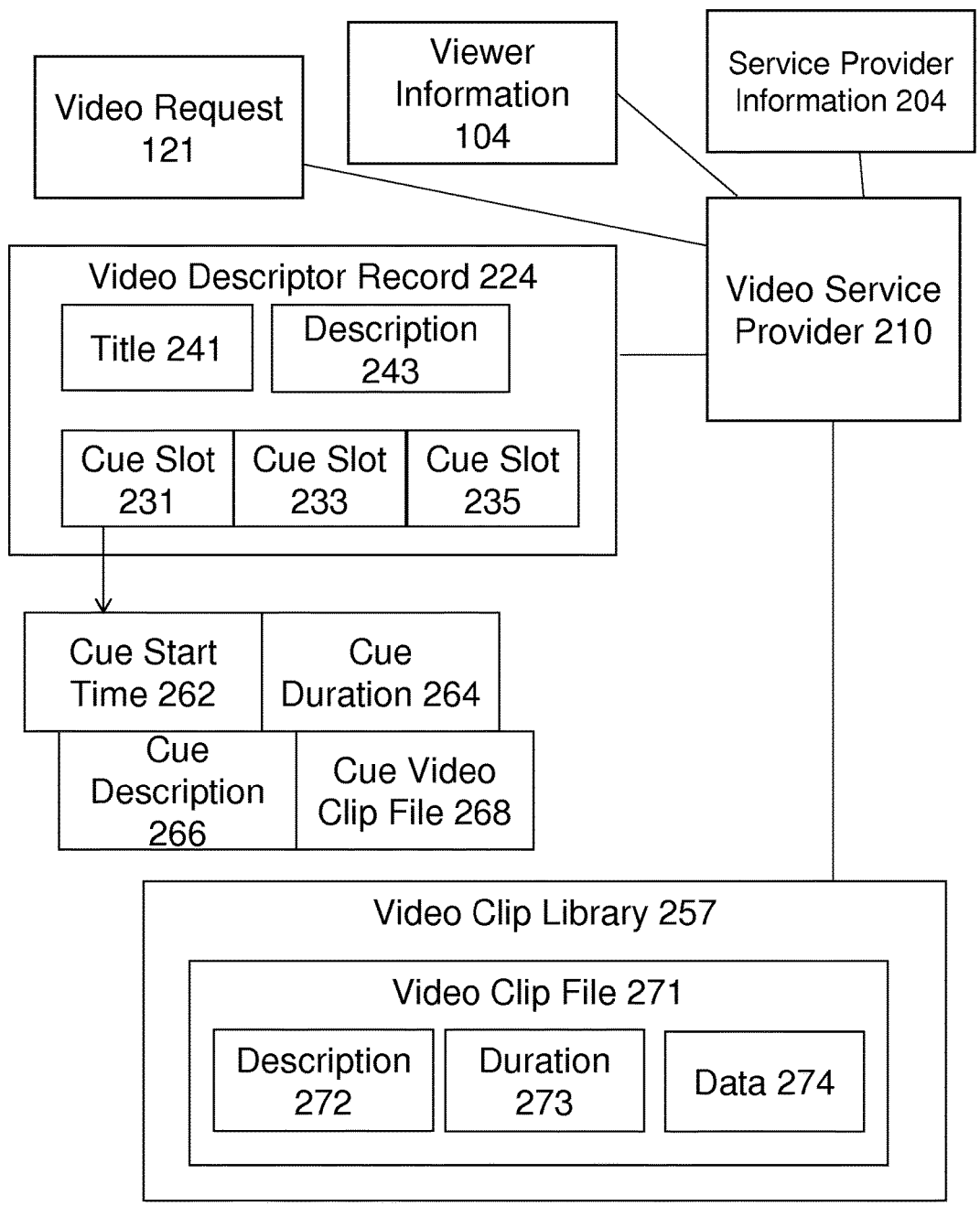
FIG. 3a illustrates an embodiment of steps to generate a video.
Figure 3B:
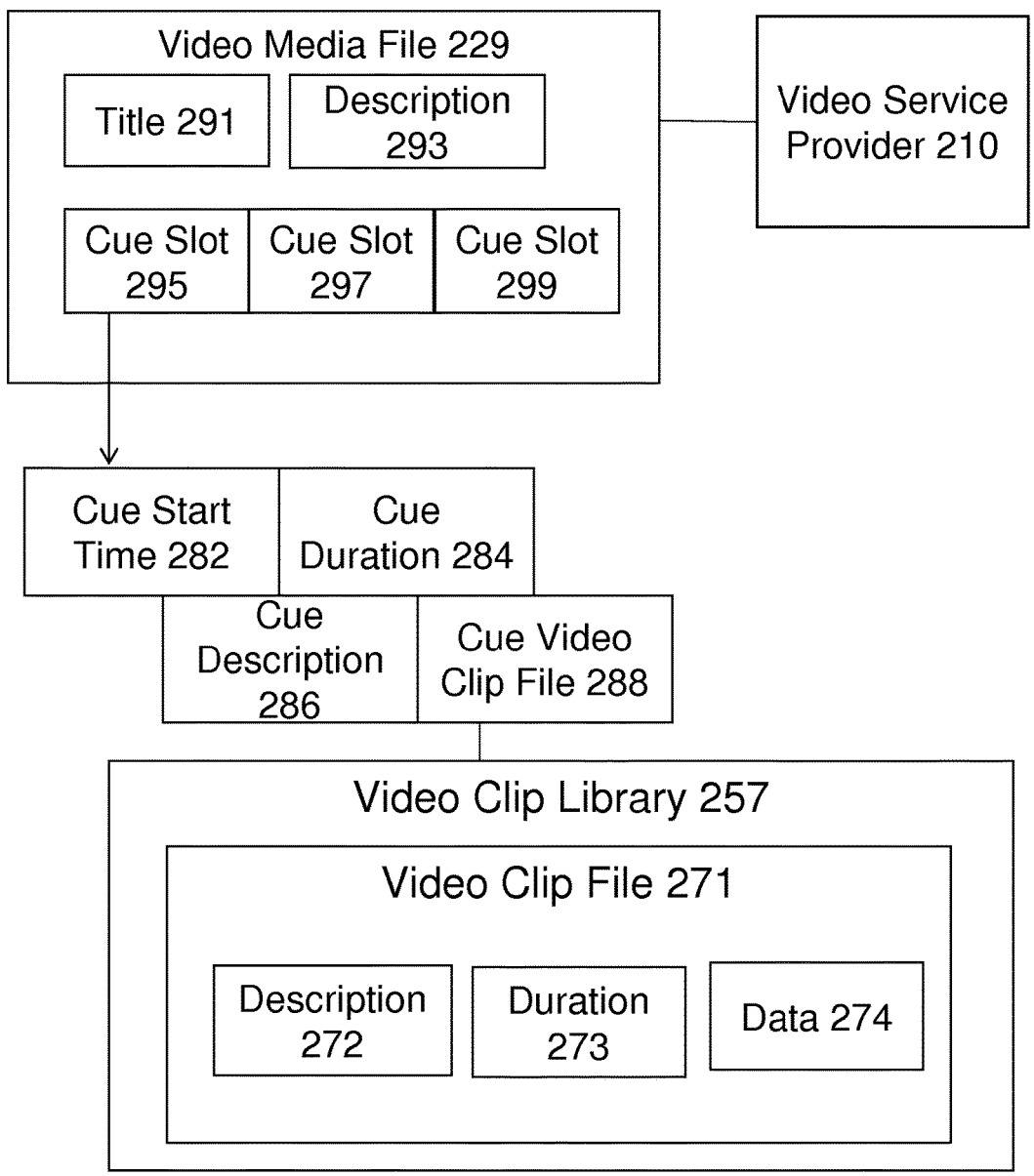
FIG. 3b illustrates an embodiment of a video media file.

FIGS. 3a-3b together illustrates an exemplary embodiment of a video service provider generating a video media file based on a video request. In the embodiment, video service provider 210 receives video request 121 requesting a video. Video service provider 210 is coupled to a plurality of video descriptor records and matches video request 121 against video descriptor record 224 to select video descriptor record 224.

In one embodiment, video descriptor record 224 includes a title 241, a description 243, a plurality of cue slots such as cue slots 231, 233, 235. Each cue slot, such as cue slot 231 may include cue start time 262, cue duration 264, cue description 266, and a cue video clip file 268. In one embodiment, cue slots 231-235 are ordered sequentially according to their cue start time. In one embodiment, a cue slot with an earlier cue start time indicates its order is before a cue slot with a later cue start time.

In one embodiment, video request 121 includes one or more pieces of information. In one embodiment, video request 121 includes a video identity or a video title. Video service provider 224 matches the video identity or video title in video request 121 against title 241 and description 243 in video descriptor record 224. In one embodiment, video request 121 includes a title of a television show, movie or a video, such as "Fringe, Season 2 Episode 6", "Late Night Show", "Star Trek—Into Darkness", "Star Wars", "Return of Jedi", "Expandable II", "iPad Split-Screen Multitask Application", "Vienna Philharmonic New Year's Concert 2015 Part 2", "Superbowl XXXIII". In one embodiment, video request 121 includes a genre or video category such as sports, thriller, sci-fi, animation, kid, mystery, food or travel. In this embodiment, description 243 of video description file 224 includes a similar genre or category. Video service provider 210 matches description 243 against video request 121.

In one embodiment, description 243 includes a plurality of casts and other actors/actresses/production members of a video whereas video request 121 includes name of an actor, an actress, a director, a producer, a screen writer, a composer, a singer, an athlete, a special effect director, or a production member. Video service provider 210 matches video request 121 against description 243.

In one embodiment, description 243 includes one or more of user reviews, critic reviews, user ratings, movie rating from Motion Picture rating system, popularity information whereas video request 121 includes a similar rating or information related to a review. Video service provider 210 matches video request 121 against description 243.

In one embodiment, description 243 includes distribution rights information such as "Suitable for China", "Japan only", "Asia", "Europe", "Not available outside North America", whereas video request 121 includes a location. In one embodiment, description 243 includes location information such as "San Francisco Bay Area edition", "Boston", "Spain", "Latin America", "North Africa", "$2^{nd}$ floor of Empire State Building", "Airport only", "Starbucks Special", "McDonald's Kids Edition", "Apple Store", "Stonetown Mall of San Francisco", "Chinatown, New York City", "Conference room", a cubical in a company, a hotel room, a street address, a neighborhood, a geo-physical region, a location in a cruise, a location in a building, a retail shop, a retail franchise, or any appropriate location information. In one embodiment, a location in video request 121 includes a street address, a street name, a building name, a floor, a location in a building, an area within a campus, a geo-physical location/region, a room number, a facility marker, or a coordinate of a map. Video service provider 210 matches a location of video request 121 against a location information in description 243. In one embodiment, video request 121 includes more than one location information, such as a room number and a geo-physical location, or an area in a campus and a street address of the campus. In one embodiment, video service provider 210 correlates location information in video request 121 to location information in description 243 prior to matching. In one embodiment, video service provider 210 correlates the location information by converting a geo-physical location in video request 121 to a street address, converting the street address to a retail store name, and then matching the retail store name to a corresponding retail store name in a location information included in description 243. In one embodiment, video request 121 includes a location of an access point such as a wireless access point, a network interface connector of a network switch. Video service provider 210 may convert the location of the access point to a geo-physical location, a building location, altitude information, a floor number, a campus location, or a street address. In one embodiment, video request 121 includes an IP address. Video service provider 210 may convert an IP address of video request 121 to a location.

In one embodiment, video request 121 includes a quality information or a capability of a video player as illustrated in FIG. 1, such as 1080p, High Definition, 4K, 3-D, low resolution, stereo, 5.1 Dolby, 7.1 Dolby, 2.1 Dolby, wide angle, panoramic, dual screen, MPEG-2, MPEG-4, progressive, multi-session streams, low-bandwidth, or other video quality and device capability information; whereas description 243 includes one or more video/audio quality and requirement information such as bandwidth requirement, processing requirement, decoding requirement, security requirement, decryption requirement, display size requirement, wearable requirement such as 3-D glasses, helmet or other device requirement. Video service provider 210 matches the quality information or the capability in video request 121 against description 243.

In one embodiment, description 243 includes a date or time information such as publication date, release date, availability date or time, time of day, or a date of year; whereas video request 121 includes a date or time information, a special event such as "Thanksgiving", "Christmas", "Valentine's Day", a time of day information such as "Morning", "Evening", "Lunch Hour", "2 pm", "3-5 pm", "Afternoon tea", "Weekend", "Spring Break", "Marin Luther King's Birthday", or "Monday Night". Video service provider 210 matches the time or date information of video request 121 against the time or date information of description 243. In one embodiment, video service provider 210 converts the time or date information of video request 121 prior to performing the matching. In one embodiment, video service provider 210 converts "Christmas" to "Christmas of 2014" which is a Thursday prior to matching. In one embodiment, video service provider 210 converts "Thanksgiving" to "Thanksgiving of 2014" which is Nov. 27, 2014. In one embodiment, video service provider 210 determines video request 121 comes from a region in the West Coast and the time information of description 243 is in East Coast time, and converts the time information in video request 121 from West Coast to East Coast prior to matching. In one embodiment, video service provider 210 converts all time and date information to a standard format prior to matching.

In one embodiment, video request 121 includes one or more preferences such as a language preference such as "Spanish", "French", "Mexico Spanish", "Singapore Chinese", a country preference such as "Malaysia", "Sweden", "Canada", a duration preference such as "long", "short", "less than 2 hours", "no more than 45 minutes", "30 minutes", a parental control preference, an audio preference, a visual effect preference, or any other video related preference. In one embodiment, description 232 includes information related to language, country, duration, visual effect, parental guide or other related information. Video service provider 210 matches corresponding information of description 243 against the preference information included in video request 121.

In one embodiment, video request 121 includes payment information such as "free", "advertisement supported", subscription information, charging account information; whereas description 243 includes payment information. Video service provider 210 matches the corresponding payment information between video request 121 and description 243.

In one embodiment, video service provider 210 determines there is a match between video request 121 and video descriptor record 224, video service provider 210 selects video descriptor record 224. In one embodiment, video service provider 210 determines there is no match, video service provider 210 does not select video descriptor record 224. In one embodiment, video service provider 210 determines there is a match when there are at least several matches of different information in video request 121. In one embodiment, video service provider 210 determines there is a match for video descriptor record 224 and another video descriptor record, video service provider 210 applies additional processing to select video descriptor record 224. In one embodiment, video service provider 210 considers additional factors as prior to selecting video descriptor record 224, as described below.

In one embodiment, video service provider 210 obtains viewer information 104 and matches the viewer information 104 against video descriptor record 224. In one embodiment, video player 120 monitors or collects viewer 101 activities over time and sends viewer 101 activities to video service provider 210 from time to time. In one embodiment, viewer information 104 is available from a network computer from a third party service provider (not shown) such as an advertisement network provider, a multi-service operator like a cable television provider, another video service provider, a web site serving video to viewer 101, or any other service provider having viewer information 104. Video service provider 210 may obtain viewer information 104 from the network computer. In one embodiment, video service provider 210 includes one or more video descriptor records in a storage module of video service provider 210, and video service provider 210 uses video descriptor record 224 from datastore to match video request 121 and viewer information 104. In one embodiment, video service provider 210 receives video descriptor record 224 from a network computing system (not shown) of a studio, a video distribution network, a television programming network, a television station, a multi-service operator, a cable television operator, a satellite television operator, an IPTV operator, or from a video production system, a live event televised video server, a corporate video server, or a personal video system. In one embodiment, video descriptor record 224 includes information related to targeted audience such as ratings for kids, adults, female, young adults, twenty-something, age group, income range, race, ethnic group such as "African American", "Asian Pacific", international regions such as "Asia", "Central America", regional information such as "North", "San Francisco Bay Area", "Downtown", fan or social media groups such as "Swift Taylor fans", "Football fans", "Oakland Raiders", "Harry Potter", "Star Trek", sponsors such as merchants, corporations, non-profit organizations, political organizations, religious organizations, "Starbucks", "Walmart", "Microsoft", "IBM", "NFL", "Burger King", "Democratic Party", "Vote Yes for Education 2016". Video service provider 210 matches targeted audience information of video descriptor record 224 against viewer information 104 such as viewer interests, viewer location, view social information, viewer demographic information, and viewer preferences. In one embodiment, some information of viewer information 104 are similar to video request 121 information and video service provider 210 matches viewer information 104 against corresponding information in video descriptor record 224. In one embodiment, video request 121 information includes a genre, similar to a favorite genre included in viewer information 104. In one embodiment, video request 121 information includes a current location similar to a location included in viewer information 104. In one embodiment, video request 121 information includes a time duration of 30 minutes similar to an average time duration of 32 minutes indicated in viewer information 104.

In one embodiment, video service provider 210 determines there is a match between viewer information 104 and video descriptor record 224, video service provider 210 may select video descriptor record 224.

In one embodiment, video service provider 210 obtains, as service provider information 204, information on the service provider organization associated with the video service provider 210. In one embodiment, video service provider 210 stores service provider information 204 and retrieves the information. In one embodiment, video service provider 210 is configured with service provider information 204 via a network video service management system (not shown). In one embodiment, the network video service management system sends service provider information 204 updates to video service provider 210, and video service provider 210 uses the updated service provider information 204 for subsequent video request processing. In one embodiment, video service provider 210 receives service provider information 204 from time to time from the network video service management system. In one embodiment, service provider information 204 includes service policies, and a business entity operating video service provider 210 changes service policies. The business entity configures the changed service policies as updated service provider information 204. In one embodiment, the business entity changes a service policy of reserving 15 minutes for advertisement to 17 minutes. In one embodiment, the business entity changes a service policy to add Latin Americans as a target demographic audience. In one embodiment, the business entity changes a service policy to remove targeting the location of "Bay Area". The video service provider 210 matches service provider information 204 against video descriptor record 224. In one embodiment, service provider information 204 includes information associated with a service provider organization, typically a business entity associated to video service provider 210. Service provider information 204 may include payment information such as "free", "advertisement sponsored", "fee based"; duration information such as "1 hour 30 minutes", "45 minutes", "27 minutes", "long", "teaser"; audio/video quality information, delivery service quality such as bandwidth, speed, media rights information such as distribution rights, watermarks, encryption, DRM information, security information, network delivery information such as private network, public network, content delivery network, sponsoring information, location preferences, or other information related to selection of video descriptor record 224. Video service provider 210 matches service provider information 204 against video descriptor record 224.

In one embodiment, video service provider 210 determines there is a match between service provider information 204 and video descriptor record 224 and may select video descriptor record 224. In one embodiment, video service provider 210 does not select video descriptor record 224 when there is no match.

In one embodiment, video service provider 210 applies a weighing factor to video request 121, viewer information 104 and service provider information 204 to determine a match against video descriptor record 224. In one embodiment, video service provider 210 is configured with the weighing factor. In one embodiment, service provider information 204 or video request 121 includes the weighing factor. In one embodiment, video service provider 210 obtains the weighing factor from a network computer, such as a network video service management system. In one embodiment, viewer information 104 has a higher weighing factor than video request 121. In one embodiment, service provider information 204 is more important than viewer information 104. In one embodiment, video request 121 is the most important factor. In one embodiment, view service provider 210 applies different weights to different type of information when matching. In one embodiment, location information is more important than transaction history. In one embodiment, social network related information is more important than viewer demographic information. In one embodiment, sponsoring information is the most important. In one embodiment, licensing information is a deciding factor such that if there is no match for distribution right, video descriptor record 224 is not selected.

In one embodiment, video service provider 210 determines video descriptor record 224 and another video descriptor record both match video request 121. Video service provider 210 selects video descriptor record 224 based on one or more other factors. In one embodiment, video service provider 210 calculates matching scores for the two matching video descriptor records based on different weighing factors on different matching information. Video service provider 210 selects video descriptor record 224 with a best matching score.

In one embodiment, after selecting video descriptor record 224, video service provider 210 generates video media file 229 (see FIG. 3b). In one embodiment, video media file 229 includes title 291, description 293 and a plurality of cue slots such as cue slot 295, cue slot 297 and cue slot 299.

In one embodiment, video service provider 210 copies title 241 of video descriptor record 224 to title 291 of video media file 229. In one embodiment, video service provider 210 copies description 243 of video descriptor record 224 to description 293 of video media file 229. In one embodiment, video service provider 210 copies part of description 243 to description 293, for example, a plot description, descriptions of cast members, actors, actresses, director, producer, props, scenes, or other description of interest to viewer 101 when played by video player 120. In one embodiment, video service provider 210 does not copy part of description 242, for example, distribution right information, location information, or visual effect information. In one embodiment, video service provider 210 copies the information of description 243 that are useful to a video player or that may provide useful information to a viewer. In one embodiment, video service provider 210 determines video player 110 is capable of recognizing images from video data, and video service provider 210 copies description 243 containing data related to one or more patterns or images from video data. In one embodiment, video player is capable of collecting viewer ratings, video service provider 210 copies description 243 containing data assisting video player 110 to collect viewer ratings. In one embodiment, description 243 includes data relating a specific video player vendor, video service provider 210 determines if video player 110 matches the specific video player vendor and copies the related data of description 243. In one embodiment, video player 110 is capable of displaying description 243 concurrently with video data, video service provider 210 copies description 243 so that video player 110 may determine, based on viewer input, display description 243. In one embodiment, video data includes a piece of news and description 243 includes related news. Viewer may request video player 110 to display related news concurrently with the video data. In one embodiment, In one embodiment, video data includes a travel guide of a city, and description 243 includes a map of the city, a history of the city, celebrities of the city. In one embodiment, video service provider 210 selects a part of history and celebrities of the city based on viewer information 104 and copies the selected description 243 information.

In one embodiment, video service provider 210 processes the plurality of cue slots of video descriptor record 224 and uses them to generate the plurality of cue slots in video media file 229.

In one embodiment, video service provider 210 processes cue slot 231 of video descriptor record 224. In one embodiment, video service provider 210 selects video clip file 271 from video clip library 257 based on information associated with the cue slot 231. In one embodiment, cue slot 231 includes cue video clip file 268 which matches video clip file 271 and video service provider 210 selects video clip file 271.

In one embodiment, video service provider 210 matches cue slot 231, optionally with description 243, viewer information 104, service provider information 204 and video request 121 against video clip library 257 to select matching video clip file 271. In one embodiment, cue slot 231 corresponds to a cut scene, a scene, an animation, a stage, an act, a sequence of actions, a video clip from a camera angle, a performance, a performed song, a piece of newscast, a filler video clip, or a duration of video data. Cue slot 231 may include cue duration 264, cue start time 262, and cue description 266.

In one embodiment, video clip file 271 of video clip library 257 includes description 272, duration 273 and video data 274. In one embodiment, description 272 of video clip file 271 includes a plot, one or more cast information, a scene description, an animation description, a date and time information, a camera angle information, a piece of news description, a title, a title of a performance, a song title, information of licenses and rights, information of location, a time and date information, an audio or video quality information, a user or critic review, a rating information, a language information, a payment information, a viewer demographic information, or other information that is related to video data 274. Video service provider 210 matches description 272 against the combined description of cue description 266, viewer information 104, service provider information 204 and video request 121 similar to aforementioned matching of description, and is therefore not repeated here. A few embodiments are described here to illustrate the matching. In one embodiment, the combined description includes payment information of "free" and description 272 includes also payment information of "free", there is a match. In one embodiment, the combined description includes a distribution right region of "China", and description 272 includes right information of "Americas only", then description 272 does not match. In one embodiment, the combined description includes an actor of "Angelina Jolie", and description 272 includes an actor of "Angelina Jolie", then description 272 matches.

In one embodiment, video service provider 210 matches duration 273 against cue duration 264, further in consideration of additional duration information included in viewer information 104, service provider information 204 or video request 121. In one embodiment, duration 273 is the same as cue duration 264, or within a range of cue duration 264 such as 5%, 10%, 5 seconds, 2 minutes, there is a match between duration 273 and cue duration 264. In one embodiment, the range is pre-determined by video service provider 210 or is determined by the additional duration information. In one embodiment, the additional duration information indicates a longer duration, duration 273 matches cue duration 264 when duration 273 is longer than cue duration 264 or slighter shorter than cue duration 264. In one embodiment, the additional duration information indicates a short duration, duration 273 matches cue duration 264 when duration 273 is shorter than cue duration 264 or slightly longer than cue duration 264. In one embodiment, the additional duration information includes a total video expected duration, and video service provider 210 calculates the accumulation of durations of matching video clip files for a plurality of cue slots of video descriptor record 224. Video service provider 210 rejects video clip file 271 if the accumulated duration exceeds the total video expected duration. In one embodiment, video service provider 210 calculates the total video expected duration by summing up all the cue durations of the plurality of cue slots of video descriptor record 224.

In one embodiment, when video service provider 210 determines there is a match of video clip file 271, video service provider 210 selects video clip file 271 and copies video clip file 271 to cue video clip file 288 of cue slot 295 of video media file 229. In one embodiment, cue video clip file 288 is a hyperlink, an URL, or reference referring to video clip file 271. In one embodiment, video service provider 210 copies duration 264 to cue duration 284. In one embodiment, cue duration 273 is used to copy to cue duration 284.

In one embodiment, video service provider 210 selects video clip file 271 and another video clip file for cue slot 231 such that video clip file 271 and the another video clip file are to be displayed together. Video service provider 210 copies video clip file 271 and the another video clip file to cue video clip file 288 of cue slot 295. In one embodiment, video service provider 210 generates executable programming instructions, which when executed, causes the video player 110 to display cue video clip file 271 and the other video clip file, both included in cue video clip file 288 together. In one embodiment, video service provider 210 copies or combines cue description 266 and description 272 of video clip file 271 to cue description 286. In one embodiment, video service provider 210 selects and copies a part of description 272 and cue description 266 based on viewer information 104 and video request 121. In one embodiment, video request 121 includes a capability of video player 110, video service provider 210 selects the combination of information to be stored as description 286 based on the capability. In one embodiment, viewer information 104 includes an interest, and video service provider 210 selects the combination of information to be stored as description 286 based on the interest.

In one embodiment, video service provider 210 copies cue start time 262 of cue slot 231 to cue start time 282 of cue slot 295. In one embodiment, video service provider 210 calculates cue start time 282 by adding cue duration and cue start time of a previous cue slot of video media file 229. In one embodiment, cue start time of cue slot 297 is to be set as the sum of cue start time 282 and cue duration 284 of cue slot 295.

In one embodiment, video service provider 210 selects other video clip files to match cue slots 231, 233, 235, and copies the selected video clip files to cue slots 295, 297, 299.

In one embodiment, video service provider 210 does not process all the cue slots in video descriptor record 224, and video service provider 210 copies only the processed cue slots of video descriptor record 224 to video media file 229. In one embodiment, video service provider 210 calculates the accumulated duration of processed cue slots of video descriptor record 224, determines the accumulated duration matches the expected duration, and determines not to process the remaining cue slots in video descriptor record 224.

Returning to FIG. 1, video service provider 210 sends video media file 229 to video player 120. In one embodiment, video service provider 210 sends only the video data of cue video clip files of cue slots of video media file 229. In one embodiment, video service provider 210 does not send any cue duration nor cue description of video media file 229. In one embodiment, video service provider 210 sends selectively part of video media file 229 to video player 120, based on, in part, viewer information 104, service provider information 204, video request 121 or video player 120 capabilities.

In one embodiment, video service provider 210 sends video media file 229 as a file downloaded to video player 120. In one embodiment, video service provider 210 streams video media file 229 to video player 120. In one embodiment, video service provider 210 sends cue slots of video media file 229 according to requests by video player 120. In one embodiment, video player 120, upon receiving video media file 229, sends one or more separate requests to video service provider 210 to stream cue video clip files included in video media file 229. In one embodiment, video player 120 plays a cue slot, such as cue slot 295, of video media file 229 by displaying video signals or video data of cue video clip file 288 on a display 111. In one embodiment, video player 120 displays the cue start times of cue slots of video media file 229 on a time line on a display. In one embodiment, video player 120 displays description 293 and cue description 286 on a display, which may be a different display or the same display displaying cue video clip file 288. In one embodiment, video player 120 displays another video at the beginning or the end of a cue slot. In one embodiment, video player 120 displays cue slot 295, then another video at the end of cue slot 295, then sends a request to obtain cue slot 297 and displays cue slot 297.

In one embodiment, video service provider 210 processes cue slot 233 of video descriptor record 224 after receiving a request from video player 120 for a corresponding cue slot 297 of video media file 229. In one embodiment, video service provider 210 determines cue slot 297 is associated with cue slot 233 of video descriptor record 224 and processes cue slot 233 after video clip library 257 receives a video clip file matching cue slot 233. For example, in this embodiment, for an on-demand or live event, the video service provider 210 determines that cue slot 233 in the video descriptor record 224, which corresponds to the cue slot 297 in the video media file 229, and waits for the matching video clip file 271 in the video clip library 257 before processing cue slot 233. In this embodiment, video service provider 210 may send a partial video media file 229 to video player 120 while video service provider 210 waits to process cue slot 233. In one embodiment, video service provider 210 applies this delay processing method to televised live events. In one embodiment, video service provider 210 applies this delay processing method in order to allow sponsoring businesses to compete or to bid for cue slot 233. In one embodiment, video service provider 210 receives updated viewer information or updated service provider information prior to process cue slot 233.

In one embodiment, cue description 286 of cue slot 295 of video media file 229 includes executable programming instructions, which when executed, causes the video player 120 to display cue video clip file 288, and optionally cue description 286. In one embodiment, cue video clip file 288 includes executable programming instructions and data, which when executed, causes the video player 120 to generate and display an animation.

In one embodiment, after video player 120 receives video media file 229 based on video request 121, video player 120 sends another video request 121 to obtain an updated video media file 229. In one embodiment, video service provider 210 generates an updated video media file 229 and sends the updated video media file 229. In one embodiment, video service provider 210 sends an updated cue slot 297 of the updated video media file 229 to video player 120. In one embodiment, video service provider 210 generates a second video media file and sends the second video media file to video player 120. In one embodiment, video player 120 receives an update of video media file 229 and applies the update to stored video media file 229. In one embodiment, video player 120 receives a different video media file and replaces stored video media file 229 by the different video media file.

In one embodiment, video player 120 communicates with video service provider 210 using Web technologies. In one embodiment, video player 120 sends video request 121 using HTTP protocol. In one embodiment, video request 121 is in an URL format. In one embodiment, video request 121 is in an XML format. In one embodiment, video service provider 210 publishes a Web-based API format for video request 121.

In one embodiment, video clip library 257 includes a database management system.

The aforementioned processes can be applied to different situations to generate a video for a viewer. In one embodiment, a studio produces a movie composed of a plurality of video clips. The studio decides to market the movie to different countries, and uses local supporting actors and actresses. In one video clip of a scene, Chinese actors are used. In another video clip of the same scene, Vietnamese actors are used. In one embodiment, video service provider 210 selects the Chinese actor video clip when location information indicates China. In one embodiment, video service provider 210 selects the Vietnamese actor video clip when location information indicates Vietnam. In both embodiments, video service provider 210 selects a similar video clip of the same scene when neither Chinese support actors nor Vietnamese support actors appear.

In one application embodiment, a sports network employs several sets of cameras for a televised sports event, for example a football game between San Francisco 49ers and Denver Broncos. One set of cameras focuses on 49er players and a second set of cameras focuses on Broncos. A third set of sky-cameras gives a bird-eye view of the game. In one embodiment, video service provider 210 determines viewer 101 is interested in 49ers, and selects video clips acquired by the 49ers-focus cameras and the sky-cameras. In one embodiment, video service provider 210 determines viewer 101 is located near Denver, and selects video clips acquired mainly from the Broncos-focus cameras. In one embodiment, viewer 101 is not related to 49er nor Denver, video service provider 210 selects, based on other information, video clips from all cameras.

In one embodiment, a television network prepares a television show with video clips of various durations. When video request 121 is processed during prime time, the television network provides service provider information 204 indication of a shorter duration, say 43 minutes, for generation of video media file 229. The shorter duration allows video player 110 to insert advertisement videos so that video media file 229 is played over 60 minutes. When video request 121 is processed during day time hours, the television network provides service provider information 204 of a longer duration, say 51 minutes, for generation of video media file 229. When video request 121 is processed during late night hours and during a re-run of the television show, the television network provides service provider information 204 of duration of 55 minutes, for generation of video media file 229.

In one application embodiment, a video merchant operating video service provider 210 generates video media file 229 with payment instructions when video request 121 asks for a free video. Video media file 229 includes executable programming instructions, which when executed, causes several cue slots to play, then to pause and prompt viewer 101 to pay in order to view the remaining cue slots. In one embodiment, video service provider 210 generates a teaser video media file 229 of short duration, say 3 minutes, and programming instructions to prompt viewer 101 to pay in order to view a longer duration of the video. The payment instructions further instructs video player 110 to collect payment and to send a video request with the payment information. In one embodiment, video service provider 210 generates video media file 229 with several cue slots to include promotional video data.

In one embodiment, video service provider 210 determines video request 121 indicating a sponsoring organization, video service provider 210 selects a company logo animation video clip to be included in video media file 229, and includes programming instructions to instruct video player 110 to overlay the company logo animation video clip while playing other video clips in video media file 229.

In one application embodiment, video service provider 210 generates video media file 229 regarding a live event, such as a marathon race. Video service provider 210 selects a video clip for the first cue slot and sends video media file 229 with the first cue slot and video clip. Video player 110 sends a request to video service provider 210 requesting a second cue slot and its video clip while playing the first video clip. Upon receiving the second cue slot request, video service provider 210 may select a video clip for the second cue slot based on current events of the marathon race, the current leading runners of the race, a sudden appearance of a celebrity interview, an accident in the race, viewer information 104 and service provider information 204. In one embodiment, video player 110 receives a celebrity interview when viewer 101 has a social network identity associated to the celebrity. In one embodiment, video player 110 does not receive the celebrity interview when video player 110 location does not match the celebrity's profile.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for playing a video generated on-demand, comprising:

(a) sending a video request to a video service provider by a video player over a data network;
(b) receiving a response to the video request from the video service provider by the video player that sent the video request, the response comprising a video media file comprising a plurality of cue slots, each cue slot comprising a reference referring to a video clip file, a cue duration, and a time, wherein the plurality of cue slots are ordered sequentially according to the times of the plurality of cue slots; and
(c) processing, by the video player, the plurality of cue slots without user interaction with the cue slots according to the sequential order of the plurality of cue slots, wherein the processing of the plurality of cue slots comprises:
 (c1) playing video data in a given video clip file referred to by a given reference in a given cue slot of the plurality of cue slots;
 (c2) during the playing of the video data in the given video clip file, sending, by the video player to a video service provider, a next video request comprising a next reference and a next cue duration in a next given cue slot following the given cue slot in the sequential order of the plurality of cue slots;
 (c3) receiving, by the video player from the video service provider, a next video clip file referred to by the next reference and having a duration matching the next cue duration as a response to the next video request;
 (c4) playing video data in the next video clip file by the video player after the playing of the video data in the given video clip file; and
 (c5) repeating the sending (c2), the receiving (c3), and the playing (c4) for each given cue slot in the plurality of cue slots.

2. The method of claim 1, wherein the given video clip file comprises the video data in the given video clip file and a description, wherein the playing (c1) comprises:
 (c1i) displaying the video data in the given video clip file and the description by the video player.

3. The method of claim 2, wherein the description in the given video clip file comprises at least one of the following: location information and licensing information.

4. The method of claim 1, wherein the given video clip file comprise instructions for an animation, wherein the playing (c1) comprises:
 (c1i) executing the instructions by the video player to display the animation.

5. The method of claim 1, wherein the given video clip file comprise instructions for displaying video data in two or more given video clip files in an overlaid manner, wherein the playing (c1) comprises:
 (c1i) executing the instructions by the video player to display the video data in the two or more given video clip files in the overlaid manner.

6. The method of claim 1, wherein during the playing of the video data in the given video clip file, the sending (c2) comprises:
 (c2i) retrieving the next given cue slot by the video player;
 (c2ii) determining, by the video player, whether the next given cue slot contains the video data in the next video clip file referenced in the next given cue slot; and
 (c2iii) when the next given cue slot is determined to not contain the video data in the next video clip file, sending, by the video player to the video service provider, the next video request to the video service provider to send the next video clip file.

7. The method of claim 1, wherein the playing (c1) comprises:
 (c1i) sending, by the video player to the video service provider, a given video request to the video service provider comprising the given reference and a given cue duration in the given cue slot;
 (c1ii) receiving, by the video player from the video service provider, the given video clip file referred to by the given reference and having a duration matching the given cue duration as a response to the given video request; and
 (c1iii) playing the video data in the given video clip file by the video player.

8. The method of claim 1, wherein the sending (c2) comprises:
 (c2i) after receiving the video media file, sending, by the video player to the video service provider, a new video request for an updated video media file;
 (c2ii) receiving an updated cue slot as a response to the new video request;
 (c2iii) applying the updated cue slot to the next given cue slot; and
 (c2iv) during the playing of the video data in the given video clip file, sending, by the video player to the video service provider, the next video request comprising the next reference and the next cue duration in the updated next given cue slot.

9. The method of claim 1, wherein the video player consists of one of a group comprising a set top box, a video streaming player, a television set, a gaming console, a smart helmet, and a smart glassware.

10. The method of claim 1, wherein the next video request comprises one or more words related to a story, wherein the sending (c2) and the receiving (c3) comprise:
 (c2i) during the playing of the video data in the given video clip file, sending, by the video player to the video service provider, the next video request comprising the next reference and the next cue duration in the next given cue slot and the one or more words related to the story; and
 (c3i) receiving as a response to the next video request, by the video player from the video service provider, the next video clip file referred to by the next reference, having the duration matching the next cue duration, and comprising a description with a plot matching the one or more words of the story.

11. The method of claim 1, wherein the video request is a request for a live event.

12. A system, comprising:
a processor module; and
a computer readable medium comprising programming instructions embodied therein, wherein when executed by the processor module causes the processor module to:
 (a) send a video request to a video service provider by a video player over a data network;
 (b) receive a response to the video request from the video service provider by the video player that sent the video request, the response comprising a video media file comprising a plurality of cue slots, each cue slot comprising a reference referring to a video clip file, a cue duration, and a time, wherein the plurality of cue slots are ordered sequentially according to the times of the plurality of cue slots; and
 (c) process, by the video player, the plurality of cue slots without user interaction with the cue slots according to the sequential order of the plurality of cue slots, wherein the process of the plurality of cue slots comprises:
- (c1) play video data in a given video clip file referred to by a given reference in a given cue slot of the plurality of cue slots;
- (c2) during the play of the video data in the given video clip file, send, by the video player to the video service provider, a next video request comprising a next reference and a next cue duration in a next given cue slot of the plurality of cue slots;
- (c3) receive, by the video player from the video service provider, a next video clip file referred to by the next reference and having a duration matching the next cue duration as a response to the next video request;
- (c4) play the video data in the next video clip file by the video player after the play of the video data in the given video clip file; and
- (c5) repeat the send (c2), the receive (c3), and the play (c4) for each given cue slot in the plurality of cue slots.

13. The system of claim 12, wherein the given video clip file comprises the video data in the given video clip file and a description, wherein the play (c1) comprises:
- (c1i) display the video data in the given video clip file and the description.

14. The system of claim 13, wherein the description in the given video clip file comprises at least one of the following: location information and licensing information.

15. The system of claim 12, wherein the given video clip file comprise programming instructions for an animation, wherein when executed by the processor module, causes the processor module to display the animation.

16. The system of claim 12, wherein the given video clip file comprise programming instructions for displaying video data in two or more given video clip files in an overlaid manner, wherein when executed by the processor module causes the processor module to display the video data in the two or more given video clip files in the overlaid manner.

17. The system of claim 12, wherein during the play of the video data in the given video clip file, the send (c2) comprises:
- (c2i) retrieve the next given cue slot by the video player;
- (c2ii) determine, by the video player, whether the next given cue slot contains the video data in the next video clip file referenced in the next given cue slot; and
- (c2iii) when the next given cue slot is determined to not contain the video data in the next video clip file, send, by the video player to the video service provider, the next video request to the video service provider to send the next video clip file.

18. The system of claim 12, wherein the send (c2) comprises:
- (c2i) after receiving the video media file, send, by the video player to the video service provider, a new video request for an updated video media file;
- (c2ii) receive an updated cue slot as a response to the new video request;
- (c2iii) apply the updated cue slot to the next given cue slot; and
- (c2iv) during the playing of the video data in the given video clip file, send, by the video player to the video service provider, the next video request comprising the next reference and the next cue duration in the updated next given cue slot.

19. The system of claim 12, wherein the next video request comprises one or more words related to a story, wherein the send (c2) and the receive (c3) comprise:
- (c2i) during the playing of the video data in the given video clip file, send, by the video player to the video service provider, the next video request comprising the next reference and the next cue duration in the next given cue slot and the one or more words related to the story; and
- (c3i) receive as a response to the next video request, by the video player from the video service provider, the next video clip file referred to by the next reference, having the duration matching the next cue duration, and comprising a description with a plot matching the one or more words of the story.

20. The system of claim 12, wherein the video request is a request for a live event.

21. A computer readable medium comprising programming instructions embodied therein, wherein when executed by a processor module causes the processor module to:
- (a) send a video request to a video service provider by a video player over a data network;
- (b) receive a response to the video request from the video service provider by the video player that sent the video request, the response comprising a video media file comprising a plurality of cue slots, each cue slot comprising a reference referring to a video clip file, a cue duration, and a time, wherein the plurality of cue slots are ordered sequentially according to the times of the plurality of cue slots; and
- (c) process, by the video player, the plurality of cue slots without user interaction with the cue slots according to the sequential order of the plurality of cue slots, wherein the process of the plurality of cue slots comprises:
  - (c1) play video data in a given video clip file referred to by a given reference in a given cue slot of the plurality of cue slots;
  - (c2) during the play of the video data in the given video clip file, send, by the video player to a video service provider, a next video request comprising a next reference and a next cue duration in a next given cue slot following the given cue slot in the sequential order of the plurality of cue slots;
  - (c3) receive, by the video player from the video service provider, a next video clip file referred to by the next reference and having a duration matching the next cue duration as a response to the next video request;
  - (c4) play video data in the next video clip file by the video player after the play of the video data in the given video clip file; and
  - (c5) repeat the send (c2), the receive (c3), and the play (c4) for each given cue slot in the plurality of cue slots.

22. The medium of claim 21, wherein the given video clip file comprises the video data in the given video clip file and a description, wherein the play (c1) comprises:
- (c1i) display the video data in the given video clip file and the description.

23. The medium of claim 22, wherein the description in the given video clip file comprises at least one of the following: location information and licensing information.

24. The medium of claim 21, wherein the given video clip file comprise programming instructions for an animation, wherein when executed by the processor module, causes the processor module to display the animation.

25. The medium of claim 21, wherein the given video clip file comprise programming instructions for displaying video data in two or more given video clip files in an overlaid manner, wherein when executed by the processor module causes the processor module to display the video data in the two or more given video clip files in the overlaid manner.

26. The medium of claim 21, wherein during the play of the video data in the given video clip file, the send (c2) comprises:
- (c2i) retrieve the next given cue slot by the video player;
- (c2ii) determine, by the video player, whether the next given cue slot contains the video data in the given video clip file referenced in the next given cue slot; and
- (c2iii) when the next given cue slot is determined to not contain the video data in the next video clip file, send, by the video player to the video service provider, the next video request to the video service provider to send the next video clip file.

27. The medium of claim 21, wherein the send (c2) comprises:
- (c2i) after receiving the video media file, send, by the video player to the video service provider, a new video request for an updated video media file;
- (c2ii) receive an updated cue slot as a response to the new video request;
- (c2iii) apply the updated cue slot to the next given cue slot; and
- (c2iv) during the playing of the video data in the given video clip file, send, by the video player to the video service provider, the next video request comprising the next reference and the next cue duration in the updated next given cue slot.

28. The medium of claim 21, wherein the next video request comprises one or more words related to a story, wherein the send (c2) and the receive (c3) comprise:
- (c2i) during the playing of the video data in the given video clip file, send, by the video player to the video service provider, the next video request comprising the next reference and the next cue duration in the next given cue slot and the one or more words related to the story; and
- (c3i) receive as a response to the next video request, by the video player from the video service provider, the next video clip file referred to by the next reference, having the duration matching the next cue duration, and comprising a description with a plot matching the one or more words of the story.

29. The medium of claim 21, wherein the video request is a request for a live event.

* * * * *